B. SLOPER.
Portable Gas-Machines.
No. 143,426.  Patented Oct. 7, 1873.
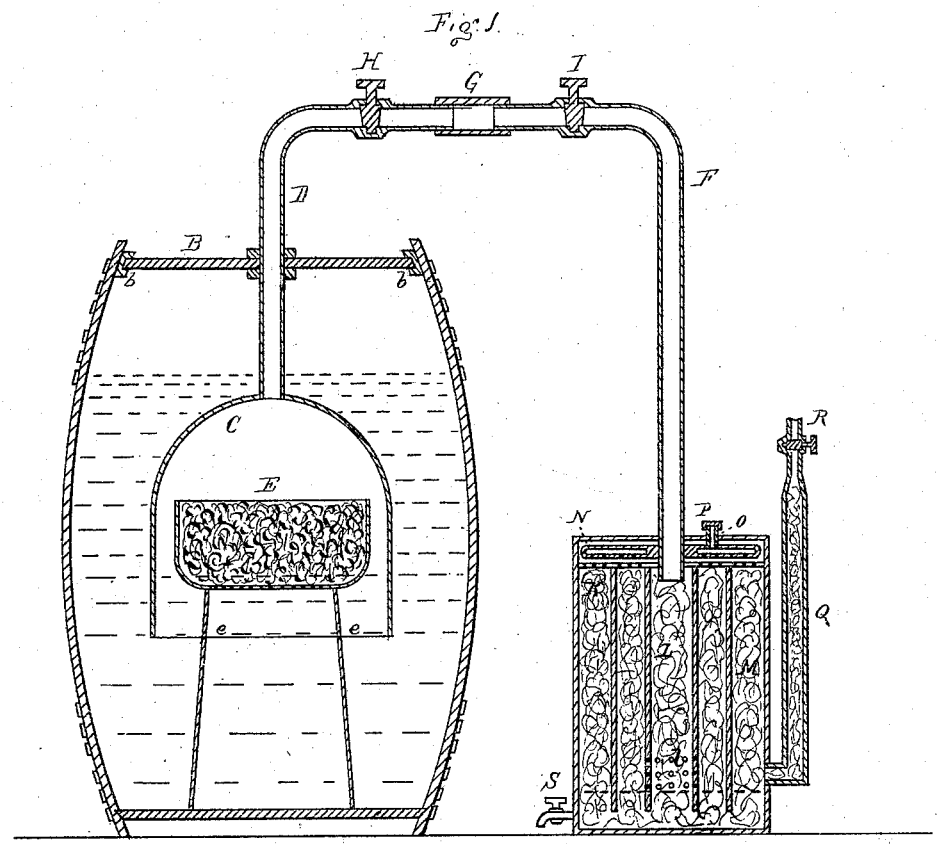
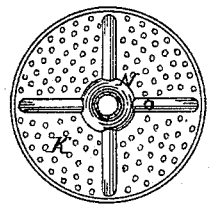
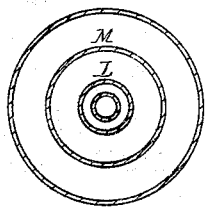

UNITED STATES PATENT OFFICE.

BYRON SLOPER, OF NEW YORK, N. Y.

IMPROVEMENT IN PORTABLE GAS-MACHINES.

Specification forming part of Letters Patent No. 143,426, dated October 7, 1873; application filed September 23, 1873.

*To all whom it may concern:*

Be it known that I, BYRON SLOPER, of the city, county, and State of New York, have invented a new and Improved Portable Apparatus for Generating and Carbureting Hydrogen Gas, of which the following is a specification:

The nature of my invention relates to a new and improved portable apparatus for generating and carbureting gas for heating and illuminating purposes, wherein the carbureter and generator are so combined and arranged that the gas will be generated and carbureted automatically, when required for use, in proper quantity only; and it consists of a cheap and effective generator, which can be made from any ordinary barrel or cask, in combination with a carbureter containing absorbent packing material distributed throughout its interior in passages formed by a series of concentric partitions attached to a perforated partition secured in the upper part of said carbureter, above which is a perforated distributing-pipe through which the volatile hydrocarbon may be filled and showered over and through the absorbent packing, so as to saturate it thoroughly and effectively, any surplus falling to the bottom of the carbureter, where it is retained. The generator consists, simply, of a whisky or wine cask, or other inexpensive vessel, with a cross-bar, which may be locked across its mouth; said cross-bar sustaining a bell by means of a pipe passing through and securely fastened to it, which serves to convey the gas to the carbureter. The bell, when in place, is supported over a perforated basket or tray containing iron borings or turnings, by means of which the gas is generated, as will be more fully hereinafter described. The absorbent material which I use is a mixture of picked cotton and "excelsior" thoroughly commingled, which offers many advantages over any other packing, the cotton being the best absorbent known, and the excelsior acting as a spring and bearing up the cotton and preventing it from matting. The principal advantages of my apparatus are its cheapness and reliability, nothing more than a common whisky or wine cask being required for the generator; and the carbureting-vessel being cheaply constructed of tin or other similar material, but, at the same time, so arranged in its interior as to thoroughly charge the gas with the hydrocarbon vapor, which is an extremely cheap and brilliant illuminating material. The gas being generated and carbureted automatically only in quantities, as required for use, no waste is incurred when the apparatus is not in operation, and consequently no expense can arise from this source; and as no valves or cocks are required for admitting the acidulated water, the machine cannot possibly get out of order, but must always be reliable and in working condition.

In the drawing, Figure 1 represents a sectional view of my apparatus; Fig. 2, a view with the top of the carbureter removed, and Fig. 3 a view of the carbureter with the top and perforated partition removed.

A represents the generator, consisting of an ordinary whisky or wine cask, and B a bar of wood or other material secured across the mouth of the cask, so that it can be conveniently detached and removed by means of locks b b on opposite sides of the cask. C represents an inverted bell secured to the end of a tube, D, which passes through the cross-bar B and is securely fastened thereto, and serves to convey the gas to the carbureter. E is a perforated basket or tray supported on legs e e, under the bell, when in place. The tube D is bent, as shown, and attached to the tube F of the carbureter by means of a coupling, G, both tubes being provided with cocks H I, as shown. The carbureter consists of a vessel of suitable size, of tin or other proper material, containing a perforated partition, K, in its upper part, to which are secured the concentric partitions L M extending to near the bottom of the carbureter. The pipe or tube F extends through the center of the perforated partition into the upper end of the compartment formed by the partition L. Near the bottom of the partition L are a series of perforations, *l*. Between the partition K and the top of the generator is a four-armed distributing-pipe, N, perforated on the under side and connected with a pipe, O, extending through the top of the carbureter to the outside, and provided with a cap, P. Q is a condenser communicating with the lower part of the carbureter above the level of the hydrocarbon liquid, and filled with excelsior packed tightly, the upper end of the same communicating with the service-pipe R leading to the burners. S is a pipe through which the carbureter may be emptied.

In putting my apparatus in operation, I remove the cross-bar and bell, and fill the basket with iron borings or turnings. I then replace them and lock the cross-bar across the mouth of the barrel or cask, opening the cock in the tube. I then pour into the cask, until it is filled to a few inches above the bell, a mixture of sulphuric acid and water, and then connect the pipe with the pipe of the carbureter. The acidulated water, on coming in contact with the iron borings or turnings, will immediately begin to generate hydrogen gas, which will pass over into the carbureter and through the several passages formed therein by the concentric partitions, taking the course shown by the arrows. It will then pass to the condenser Q, where any superfluous moisture will be condensed, and from thence to the burners. When the machine is not in operation, the gas will be generated and will accumulate in the bell, forcing out the acidulated water away from the borings in the basket, when the generation of the gas will cease, to be commenced again when the pressure is relieved, upon putting the machine in operation, by lighting the gas.

What I claim is—

1. A carbureter consisting of a cask, A, in combination with a removable cross-bar locked across its mouth, and carrying the inverted bell, substantially as described.

2. The carbureter, consisting of concentric partitions, in combination with the perforated partition to which they are attached and the distributing-pipe, substantially as described.

3. The packing for gas-machines, consisting of picked cotton and excelsior thoroughly mixed and commingled, as and for the purposes herein set forth and described.

BYRON SLOPER.

Witnesses:
CHAS. L. COOMBS,
JAMES KENLEY.